Dec. 26, 1967   W. M. BJARNASON ETAL   3,359,949
TUBE-TYPE WATER HEATER
Filed Aug. 19, 1966
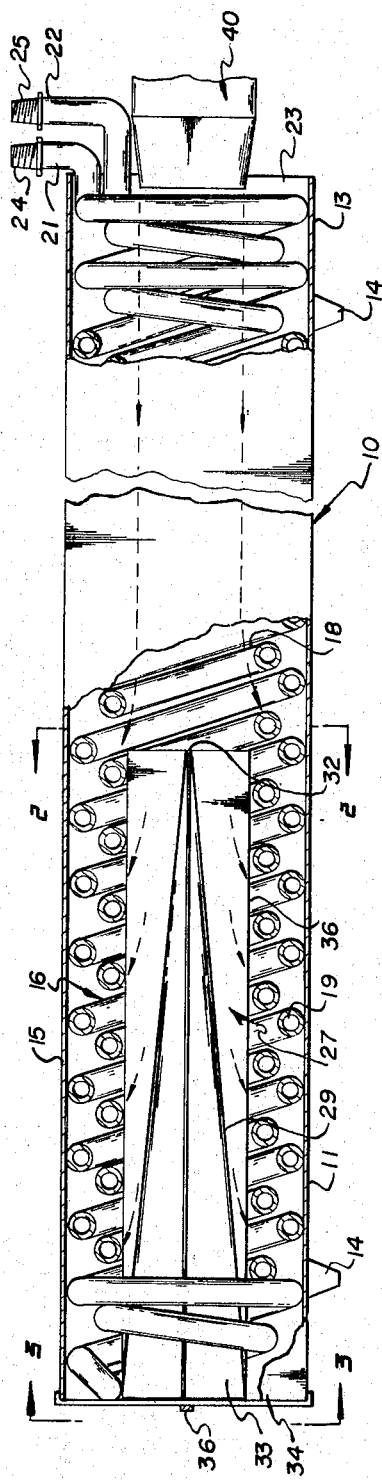
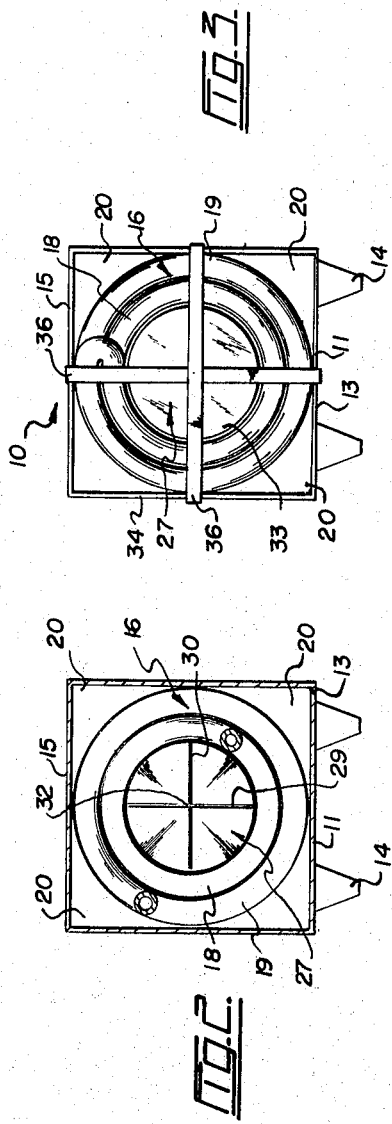
INVENTORS
WILLIAM M. BJARNASON
DONALD L. NACHBAR
BY
*Featherstonhaugh & Co*
ATTORNEYS

United States Patent Office 3,359,949
Patented Dec. 26, 1967

3,359,949
TUBE-TYPE WATER HEATER
William M. Bjarnason, 2160 Waterloo St., and Donald L. Nachbar, 1070 W. 26th Ave., both of Vancouver, British Columbia, Canada
Filed Aug. 19, 1966, Ser. No. 573,510
9 Claims. (Cl. 122—248)

ABSTRACT OF THE DISCLOSURE

A water heater having an elongated helically wound water tube encased in an elongated open ended casing of square cross sectional shape, into one of which hot gases are directed. A conical deflector is arranged centrally of the coils of the water tube to direct the gases outwardly through the coils of the tube thence between the latter and the walls of the casing.

---

This invention relates to water heaters and in particular to water heaters of a light weight compact construction.

It is an object of this invention to provide a water heater that can be operated in either a horizontal or vertical position, and so constructed and arranged that high velocity heated gases may be utilized to heat a given quantity of water in a relatively short time.

It is still a further object of this invention to provide a water heater wherein the water to be heated is carried within a helical tube over which the heated gases may be directed.

Still a further object of this invention is to provide a water heater which is relatively cheap to manufacture and of a highly compact and light weight nature to facilitate transportation thereof by aircraft to remote areas.

The present invention comprises a water tube coiled into the form of an elongated helix having spaced apart coils and being adapted to be connected in a water supply system, heater means at one end of the helix for directing a high velocity stream of hot gases axially therein, an open ended casing enclosing the helix in spaced but close relationship thereto so as to form a narrow longitudinally extending external passage, and an elongated conically shaped deflector disposed in the helix having its apex extending towards the heater means for deflecting the hot gases outwardly through and around the coils of the tube and into said passage.

In the drawings which illustrate the invention,

FIGURE 1 is a longitudinal central sectional view of a heater constructed in accordance with the invention, FIGURE 2 is a transverse sectional view taken along line 2—2 of FIGURE 1, and FIGURE 3 is an end view taken along line 3—3 of FIGURE 1.

Referring to the drawings, the water heater which is accorded the numeral 10 includes a sheet metal casing or jacket 11 which is formed of a heat resistant material, preferably of stainless steel or the like, said jacket being elongated in a longitudinal direction and preferably having a square cross sectional configuration. This casing is open at either end and in this example, one of its walls 13 is provided with legs 14 so that said casing may be supported in a horizontal position with the wall 15 opposite wall 13 extending in a horizontal plane. However, suitable legs may be provided so that the casing may be supported in a vertical position. The casing may also be provided with an exterior surfacing of suitable heat insulation, not shown.

Disposed within the casing is a helically wound tube or pipe 16, preferably formed of copper. This tube is wound to form a pair of concentrically arranged elongated helices which extend substantially the length of casing 11. The inner helix 18 is placed slightly radially inwardly from the outer helix 19, and the individual convolutions of each of the helices are longitudinally spaced apart.

The diameter of the outer helix 19 is such that it has a tight fit with the walls of casing 11 so that there is provided four narrow corner passages 20 extending longitudinally of the casing exteriorly of the outer helix 19.

The illustrated tube 16 is formed of a single length of pipe, and its ends 21 and 22 extend from one end 23 of casing 11, said pipe ends being respectively provided with suitable connectors 24 and 25 by means of which one of said pipe ends can be connected to a suitable source of a supply of water, not shown, and the other of said ends connected to a suitable conduit, not shown, for conveying heater water to hot water spigots, faucets or the like.

Disposed within the inner helix 18 is a deflector 27. This deflector is of hollow elongated conical shape and it is formed of a heat-resistant sheet material, such as stainless steel or the like, the length thereof being at least one third the length of the helices and its base diameter being substantially the same as the inside diameter of the inner helix 18.

The deflector 27 is provided with radially extending spacers 29, four being shown in the drawings, which are in the form of thin longitudinally elongated fins. These spacers may be connected as by welding or the like to the deflector 27 and their radially outermost edges 30 lie on an imaginary circle of substantially the same diameter as the inside diameter of the inner helix 18. These spacers 29 are of identical size and therefore position the deflector in co-axial relationship with said inner helix 18. This deflector is positioned with its apex 32 extending towards the end 23 of the casing and with its base 33 at the opposite end 34 of casing 11. Strap elements 36 formed of a suitable fire resistant material extend across the end 34 of the casing and against which the base 33 of the deflector may abut. However, strap elements 36 can be omitted, in which case, base 33 of the deflector will be welded or otherwise connected to the adjacent portion of inner helix 18.

At the end 23 of the casing is a heat generator 40, preferably of a type utilizing fuel such as propane or butane, and which emits a high velocity stream of hot gases. It will be appreciated that there are many and varied types of such generators now available on the market and which, therefore, would permit the manufacturer of the water heater unlimited choice as to size and operational characteristics, and it is therefore considered unnecessary to describe, in detail, the heat generator chosen.

The heat generator is mounted so as to direct the heated gases through the inner helix 18 so as to permit them to impinge upon the deflector 27. The elongated shape of the deflector will not greatly effect the velocity of the gases but will deflect them gradually outwardly through and around inner and outer helices 18 and 19 and into the passages 20 to permit them to discharge from the end 23 of the casing.

It will be observed, that as passages 20 are long and narrow, the gases will contact the outer helix 19 through the greater length of their passage through the casing so as to permit a relatively great absorption of heat. Furthermore, as the upper wall 15 in this example extends in a horizontal plane, there is no space or passage provided directly above the outer helix 19 through which heat gases, which ordinarily tend to rise, may pass and thereby reduce the efficiency of the heater.

In the construction of the heater aforesaid, the employment of thin sheet material for both the casing 11 and the deflector 27 will result in an extremely lightweight compact unit which is highly efficient and which is so constructed as to permit the use of heat generators having a high calorific output so that heater water can be supplied for immediate use without the necessity of providing storage facilities for storing the heater water until it is required.

What we claim as our invention is:

1. A water heater comprising a water tube coiled into the form of an elongated helix having spaced apart coils and being adapted to be connected in a water supply system, heater means at one end of the helix for directing a high velocity stream of hot gases axially therein, a longitudinally elongated open ended casing of square cross sectional configuration encasing the helix in spaced but close relationship thereto so as to form at least four narrow longitudinally extending external passages, and an elongated conically shaped deflector arranged in the helix having its apex extending towards the heater so as to deflect the hot gases outwardly through and around the coils of the tube and into said passages.

2. A water heater as claimed in claim 1 in which the length of the deflector is at least one-third the length of the helix.

3. A water heater as claimed in claim 1 in which the diameter of the base of the deflector is substantially the same as the inside diameter of the helix so as to deflect substantially all of the gases outwardly through said coils.

4. A water heater comprising a water tube coiled to form a plurality of elongated concentrically arranged horizontally extending helices, each helix having its coils spaced apart and being adapted to be connected in a water system, a jet type burner arranged at one end of the inner helix for directing a high velocity stream of hot gases axially thereinto, a longitudinally elongated open ended casing of square cross sectional configuration encasing the helices, said casing having its walls in close proximity to the outer helix so as to form at least four narrow longitudinally extending external passages, and an elongated conically shaped deflector arranged in the inner helix having its apex extending towards the burner for deflecting the hot gases outwardly through and around the coils of the water tube and into said passages.

5. A water heater as claimed in claim 4 in which said casing is arranged so that one of its walls extends in a horizontal plane over the helices.

6. A water heater as claimed in claim 4 including spacers extending between the deflector and the inner helix for positioning and mounting said deflector in coaxial relationship therewith.

7. A water heater as claimed in claim 6 in which the spacers comprise at least three longitudinally elongated radially extending fins.

8. A water heater as claimed in claim 4 in which the length of the deflector is at least one third the length of the inner helix.

9. A water heater as claimed in claim 4 in which the diameter of the base of the deflector is substantially the same as the inside diameter of the inner helix so as to deflect substantially all of the gases outwardly through said coils.

References Cited
UNITED STATES PATENTS

| | | | |
|---|---|---|---|
| 1,047,893 | 12/1912 | Korb | 122—250 |
| 1,049,388 | 1/1913 | Partridge | 122—250 |
| 2,983,235 | 5/1961 | Stevens et al. | 110—97 |

KENNETH W. SPRAGUE, *Primary Examiner.*